US011275022B2

(12) United States Patent
Bhongale et al.

(10) Patent No.: US 11,275,022 B2
(45) Date of Patent: Mar. 15, 2022

(54) TWO FREQUENCY COMB FOURIER SPECTROSCOPY FOR CHEMICAL SENSING (71) Applicant: Halliburton Energy Services, Inc., Houston, TX (US)

(72) Inventors: Satyan Gopal Bhongale, Cypress, TX (US); Luis Emilio San Martin, Albuquerque, NM (US); Tian He, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 191 days.

(21) Appl. No.: 16/482,588

(22) PCT Filed: Sep. 5, 2018

(86) PCT No.: PCT/US2018/049592
§ 371 (c)(1),
(2) Date: Jul. 31, 2019

(87) PCT Pub. No.: WO2020/050839
PCT Pub. Date: Mar. 12, 2020

(65) Prior Publication Data
US 2020/0363320 A1 Nov. 19, 2020

(51) Int. Cl.
*G01N 21/25* (2006.01)
*E21B 47/135* (2012.01)
*E21B 49/08* (2006.01)

(52) U.S. Cl.
CPC ......... *G01N 21/255* (2013.01); *E21B 47/135* (2020.05); *E21B 49/08* (2013.01)

(58) Field of Classification Search
CPC .. G01N 21/255; G01N 21/3577; G01N 21/85; G01N 2021/1793; E21B 47/135; E21B 49/08; E21B 49/081
See application file for complete search history.

(56) References Cited

U.S. PATENT DOCUMENTS 4,994,671 A  2/1991  Safinya et al.
5,166,747 A  11/1992  Schroeder et al.
(Continued)

FOREIGN PATENT DOCUMENTS

AU  2011211336  2/2013
WO  2014102572  7/2014
(Continued)

OTHER PUBLICATIONS

ISRWO International Search Report and Written Opinion for PCT/US2018/049592 dated May 29, 2019.
(Continued)

*Primary Examiner* — Michael R Wills, III
(74) *Attorney, Agent, or Firm* — John Wustenberg; C. Tumey Law Group PLLC (57) ABSTRACT The present disclosure relates generally to a system and method for increasing the reliability and data-rate transmission of information from a downhole device to the surface and from the surface to the downhole device. A fluid sampling system may comprise a downhole tool positionable in a wellbore and comprising a fluid testing chamber. The downhole tool may also comprise a light spectrum analysis unit disposed at a surface of the wellbore, wherein the light spectrum analysis unit comprises a detector. The downhole tool may further comprise a fiber optic cable for carrying light from the downhole tool to the light spectrum analysis unit, wherein the fiber optic cable is connected to the downhole tool and the light spectrum analysis unit.

25 Claims, 5 Drawing Sheets

(56) References Cited

U.S. PATENT DOCUMENTS

| | | | |
|---|---|---|---|
| 5,483,339 | A | 1/1996 | Van Aken et al. |
| 5,912,459 | A | 6/1999 | Mullins et al. |
| 7,084,392 | B2 | 8/2006 | DiFoggio et al. |
| 7,483,143 | B2 | 1/2009 | Sanders et al. |
| 8,417,748 | B2 | 4/2013 | Chang |
| 8,670,620 | B2 | 3/2014 | Robles-Kelly et al. |
| 8,693,004 | B2 | 4/2014 | Chandler et al. |
| 2004/0218176 | A1 | 11/2004 | Shammal et al. |
| 2007/0013911 | A1* | 1/2007 | DiFoggio ............... G01J 3/26 356/436 |
| 2010/0225897 | A1* | 9/2010 | Fermann ............... H01S 3/1115 356/51 |
| 2010/0282959 | A1* | 11/2010 | Dong ....................... G01V 8/02 250/269.1 |
| 2012/0211650 | A1 | 8/2012 | Jones et al. |
| 2012/0250017 | A1 | 10/2012 | Morys et al. |
| 2013/0342836 | A1 | 12/2013 | Newbury et al. |
| 2014/0070083 | A1* | 3/2014 | Zhang .................. G01J 3/0202 250/256 |
| 2014/0245826 | A1 | 9/2014 | Pope et al. |
| 2014/0253915 | A1 | 9/2014 | Ataie et al. |
| 2016/0356917 | A1* | 12/2016 | Bhongale ................ G01V 5/04 |
| 2018/0073355 | A1 | 3/2018 | Bhongale et al. |

FOREIGN PATENT DOCUMENTS

| | | | | |
|---|---|---|---|---|
| WO | WO-2016186669 | A1 * | 11/2016 | ............. E21B 49/08 |
| WO | WO-2017082928 | A1 * | 5/2017 | ............. G02F 1/365 |

OTHER PUBLICATIONS

Hänsch, T. W., & Picqué, N., Laser Spectroscopy and Frequency Combs. Journal of Physics: Conference Series, vol. 467, 012001 (2013).

N. R. Newbury, et al., Fiber laser-based frequency combs with high relative frequency stability, IEEE (2007).

Chavez Boggio, J. M., Moro, S., Windmiller, J., Zlatanovic, S., Myslivets, E., Alic, N., & Radic, S. (2009). Optical Frequency Comb Generated by Four-Wave Mixing in Highly Nonlinear Fibers. Conference on Lasers and Electro-Optics/International Quantum Electronics Conference.

Nafie, L. A. (2011). Recent advances in linear and nonlinear Raman spectroscopy. Part V. Journal of Raman Spectroscopy, 42(12), 2049-2068.

A.Schliesser,' et al., Mid-infared frequency combs, Nature Photon. vol. 6, 440 (2012).

Birgitta Bernhardt, et al., Cavity enhanced dual-comb spectroscopy, Nature Photon vol. 4 , 55 (2010).

S. A. Diddams et al., Molecular fingerprinting with the resolved modes of a femtosecond laser frequency comb, Nature. vol. 445, 627 (2007).

T. Ideguchi, et al., Raman-induced Kerr-effect dual-comb spectroscopy . Optics Letters, vol. 37, Issue 21, pp. 4498-4500 (2012).

Antonio Plaza, Pablo Martinez, Rosa Perez, and Javier Plaza. Spatial/Spectral Endmember Extraction By Multidimensional Morphological Operations. IEEE Transactions on Geoscience and Remote Sensing, vol. 40, No. 9, Sep. 2002.

Miguel A. Veganzones, Manuel Grai'ia. Endmember Extraction Methods: A Short Review. Knowledge- Based Intelligent Information and Engineering Systems . Lecture Notes in Computer Science vol. 5179, 2008, pp. 400-407.

Gruninger, J. H., Ratkowski, A. J., & Hoke, M. L. (2004). The sequential maximum angle convex cone (SMACC) endmember model. Algorithms and Technologies for Multispectral, Hyperspectral, and Ultraspectral Imagery X.

Eriksen, K. O., Jones, C. M., Freese, R., Van Zuilekom, A. H. W., Gao, L., Perkins, D., . . . Engelman, B. (2013). Field Tests of a New Optical Sensor Based on Integrated Computational Elements for Downhole Fluid Analysis. SPE Annual Technical Conference and Exhibition. SPE166415.

The Cable and Telecommunications Handbook, V. 2, Chapters, Optical Fibers, Author: Hadjifotiou, Takis, 2009.

Mid-infared Fourier transform spectroscopy with a broadband frequency comb, Florian Adler, Piotr Maslowski, Aleksandra Foltynowicz, Kevin C. Cossel, Travis C. Briles, Ingmar Hartl, and Jun Ye, Oct. 11, 2010 / vol. 18, No. 21 / Optics Express.

Molecular spectroscopy with laser frequency combs Nathalie Picque, and Theodor W. Hansch, Proceedings of the 11th International Conference on Laser Spectroscopy, 2011.

Photonic Chip-Based Optical Frequency Comb Using Soliton Cherenkov Radiation, V. Brasch, M. Geiselmann, T. Herr, G. Lihachev, M.H. P. Pfeiffer, M. L. Gorodetsky, T. J. Kippenberg, Science, vol. 351, Issue 6271.

* cited by examiner

TWO FREQUENCY COMB FOURIER SPECTROSCOPY FOR CHEMICAL SENSING

FIELD

The present disclosure relates to a system and method for increasing the reliability and transmission data-rate of downhole optical fiber telemetry to the surface. More particularly, the present disclosure relates generally to transmitting large amounts of data using frequency combs.

BACKGROUND

As downhole operations obtain ever greater amounts of data for efficient and thorough job completion, optical fiber telemetry is being implemented in an ever-increasing number of products to provide higher data rate transmission of information and data. Currently, the use of optical fiber telemetry may encounter interference and fading effects as data is transmitted over long distances. Fiber optic communication in downhole applications have also traditionally been limited to single wavelengths. This may make optical fiber telemetry in a wellbore difficult and expensive to perform. Furthermore, interference and fading effects may corrupt and/or lose data, which may prevent operators from recording and identifying all downhole conditions.

BRIEF DESCRIPTION OF THE DRAWINGS

These drawings illustrate certain aspects of some examples of the present disclosure, and should not be used to limit or define the disclosure.

DETAILED DESCRIPTION

The present disclosure relates generally to a system and method for increasing the reliability and data-rate transmission of information from a downhole device to the surface and from the surface to the downhole device. More particularly, a system and method using frequency combs may be provided. The present disclosure describes a system and method for increasing data rates, for reducing interference, and/or for reducing transmission fading effects by providing a coherent light source with narrow and well-defined spectral lines that span a broad spectral range, and a mechanism to modulate the individual spectral lines using a frequency comb. In an optical fiber telemetry system, light propagating in optical fibers may be used for carrying information from a transmitter to a receiver. Traditionally, the optical linewidth of light in fiber optic communication is broad, which may limit data transmission to fewer than one hundred and sixty channels. For example, ultra-dense wavelength division multiplexing may only allow eight channels. By increasing the number of channels, transmission of data up to one terabit per second may be possible. Without limitation, this may be accomplished using a frequency comb transmitter integrated with a wavelength division multiplexing modulation system.

Figure 1:
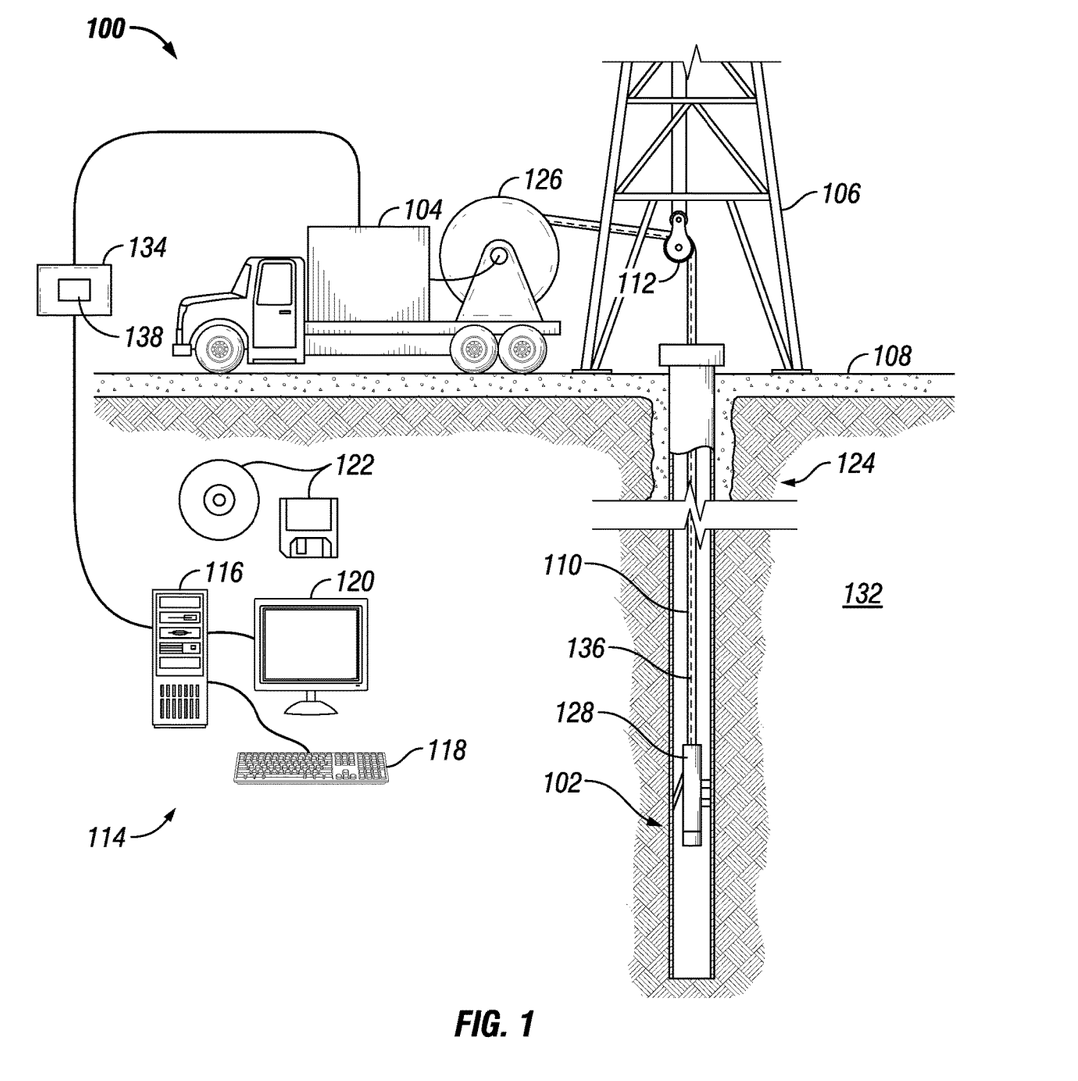
FIG. 1 illustrate an example of a well measurement system.

FIG. 1 illustrates a cross-sectional view of a fluid sampling system 100. As illustrated, fluid sampling system 100 may comprise downhole tool 102 attached a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some embodiments, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some embodiments, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 106 includes a load cell (not shown) which may determine the amount of pull on conveyance 110 at the surface of borehole 124. Information handling system 114 may control a safety valve, disposed on vehicle 104, which controls the hydraulic pressure that drives drum 126 on vehicle 104 which may reels up and/or release conveyance 110 which may move downhole tool 102 up and/or down borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may comprise a fluid testing chamber 128. An optical cell may be placed inside fluid testing chamber 128 to measure the optical properties of a downhole fluid that passes through the optical cell. Fluid testing chamber 128 may capture and house a fluid sample. The fluid sample may be the representative fluid of formation fluid located in formation 132. An optical spectral analysis of the fluid sample may be performed and/or at least partially performed in downhole tool 102. Information from a spectroscopy analysis may be transferred from the downhole tool 102 to a light spectrum analysis unit 134 disposed on surface 108, for further processing, which may then transfer the processed information to information handling system 114. Light spectrum analysis unit 134 disposed on surface 108 may reduce equipment in downhole tool 102. In examples, it should be noted that light spectrum analysis unit 134, may be disposed in information handling system 114. Light spectrum analysis unit 134 may have any of a variety of different equipment for processing light, including, but not limited to, a light source 138, detectors, monochromator, and/or a processor. Information may pass through a fiber optic cable 136, which may be disposed in conveyance 110, to information handling system 114. In examples, downhole tool 102 may be controlled by information handling system 114. Information and/or measurements may be processed further by information handling system 114 to determine properties of borehole 124, fluids, and/or formation 132.

Figure 2:
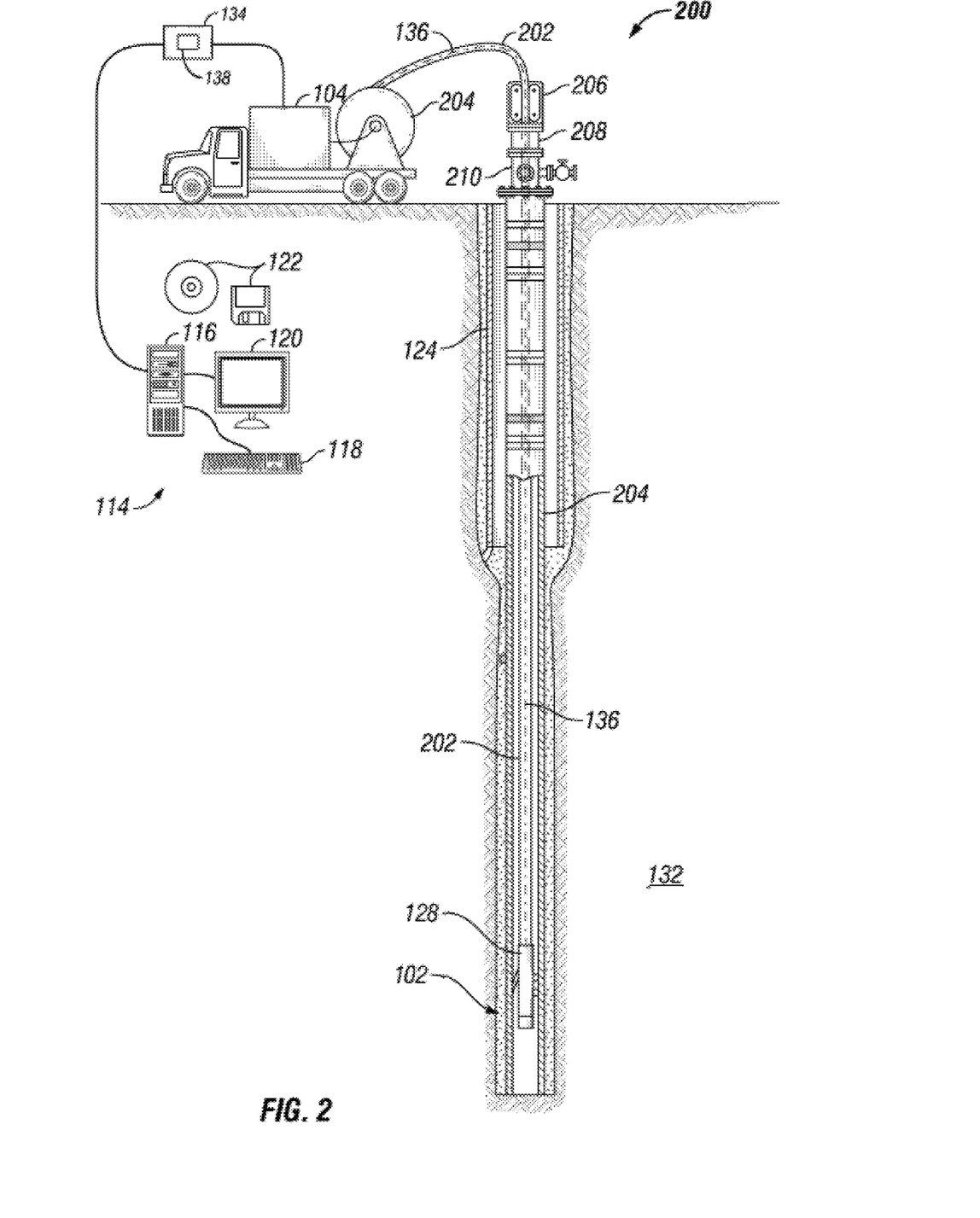
FIG. 2 illustrates another example of a well measurement system.

FIG. 2 illustrates an example in which downhole tool 102 may be disposed in coiled tubing system 200. In examples, coiled tubing system 200 may comprise coiled tubing string 202, which may be coupled with downhole tool 102. As described above, downhole tool 102 may comprise fluid testing chamber 128 and may operate and function to sample downhole fluids. In examples, coiled tubing string 202 may connect downhole tool 102 to vehicle 104. In examples, vehicle 104 may comprise spool 204. Coiled tubing string 202 may be disposed around and/or removed from spool 204 by a tubing injector 206 and injected into a borehole 124 through a packer 208 and a blowout preventer 210. This may allow coiled tubing string 202 to traverse along borehole 124 in a smooth operation. As shown, borehole 124 may be vertical. However, as detailed above, borehole 124 may be of fairly extensive reach eventually turning horizontal. Additionally, directional drilling may result in a tortuous borehole 124 with many bends and turns. Coiled tubing operations may be suited to provide access to such borehole 124, considering that deploying wireline tools in such borehole 124 may require a powered tractor tool, adding cost and weight to the instrumentation string and adding time to the operation.

In examples, coiled tubing string 202 may be a continuous length of steel, alloy steel, stainless steel, composite tubing, or other suitable metal or non-metal material that may be flexible enough to be wound on spool 204 for transportation, and spool 204 itself may be located on vehicle 104, in examples, vehicle 104 may be a coiled tubing truck for mobility. It should be noted that spool 204 may be disposed on surface 212 separate and apart from vehicle 104.

In borehole 124, coiled tubing string 202 may include a sub and one or more tools coupled to coiled tubing string 202 in addition to downhole tool 102. The subs (not illustrated) may control communication between uphole and downhole elements, and may also control communication between downhole elements such as the one or more tools by providing a common clock, power source, communication bus, and the like. In examples, the subs may be disposed on downhole tool 102 and may perform functions particular to a coiled tubing operation. For example, in a fluid sampling operation downhole tool 102 may include test chambers and sampling devices, as described above.

Downhole tool 102 at the end of coiled tubing string 202 may be controlled by information handling system 114. Information handling system 114 may operate and function with coiled tubing system 200 as described above. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Additionally, measurements taken and/or performed by downhole tool 102 may be transmitted uphole from an information handling system (not illustrated) disposed on downhole tool 102. For example, downhole tool 102 may comprise a fluid testing chamber 128. An optical cell may be placed inside fluid testing chamber 128 to measure the optical properties of a downhole fluid that passes through the optical cell. Fluid testing chamber 128 may capture and house a fluid sample. The fluid sample may be the representative fluid of formation fluid located in formation 132. An optical spectral analysis of the fluid sample may be performed and/or at least partially performed in downhole tool 102. Information from a spectroscopy analysis may be transferred from the downhole tool 102 to a light spectrum analysis unit 134 disposed on surface 108, for further processing, which may then transfer the processed information to information handling system 114. Light spectrum analysis unit 134 disposed on surface 108 may reduce equipment in downhole tool 102. In examples, it should be noted that light spectrum analysis unit 134, may be disposed in information handling system 114. Light spectrum analysis unit 134 may have any of a variety of different equipment for processing light, including, but not limited to, a light source 138, detectors, monochromator, and/or a processor. Information may pass through a fiber optic cable 136, which may be disposed in conveyance 110, to information handling system 114. In examples, downhole tool 102 may be controlled by information handling system 114. Information and/or measurements may be processed further by information handling system 114 to determine properties of borehole 124, fluids, and/or formation 132.

It should be noted that the operation and function of an optical spectral analysis may be performed in a production operation wherein fluid testing chamber 128 may be fixed to a structure either permanently and/or semi-permeably. For example, fluid testing chamber 128 may be attached to a casing, not illustrated, and may sample production fluid. The fluid sample may be representative of production fluid located in formation 132. An optical spectral analysis of the fluid sample may be performed and/or at least partially performed in fluid testing chamber 128. Information from a spectroscopy analysis may be transferred from fluid testing chamber 128 to a light spectrum analysis unit 134 disposed on surface 108, for further processing, which may then transfer the processed information to information handling system 114. In examples, it should be noted that light spectrum analysis unit 134, may be disposed in information handling system 114. Light spectrum analysis unit 134 may have any of a variety of different equipment for processing light, including, but not limited to, a light source 138, detectors, monochromator, and/or a processor. Information may pass through a fiber optic cable 136, which may be disposed in and/or on a casing, to information handling system 114. In examples, fluid testing chamber 128 may be controlled by information handling system 114. Information and/or measurements may be processed further by information handling system 114 to determine properties of production fluids.

In FIGS. 1 and 2, downhole tool 102 may operate in borehole 124 and function with light spectrum analysis unit 134, comprising light source 138, disposed on surface 108 to perform spectroscopy on the fluid sample. During operation, a light source 138 disposed in light spectrum analysis unit 134 may be controlled by information handling system 114. Information handling system 114 may initiate a measurement cycle, in which the light source 138 may be activated. A pulse of light may travel through fiber optic cable 136 and into downhole tool 102. The light pulse may then traverse through the fluid sample, disposed in fluid testing chamber 128, and travel up through fiber optic cable 136 and back to light spectrum analysis unit 134 for further processing.

Figure 3:
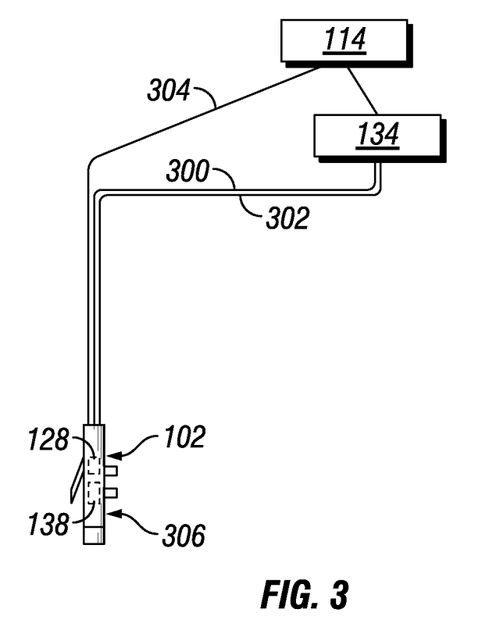
FIG. 3 illustrates another example of a well measurement system.

FIG. 3 illustrates an example in which downhole tool 102 may comprise light source 138. As illustrated in FIG. 3, downhole tool 102 may be connected to light spectrum analysis unit 134 by a first fiber optic cable 300 and second fiber optic cable 302. A control line 304 may connect downhole tool 102 to information handling system 114. Light source 138 may be disposed in downhole tool 102 and activated by information handling system 114 to perform spectroscopy measurements. It should also be noted that information handling system 114 may be disposed on downhole tool 102. This may remove the need for control line 304 as light source 138 may be attached to information handling system 114, where both devices may be disposed in downhole tool 102. During operation, information handling system 114 may initiate a measurement cycle by activating light source 138. A light pulse is sent through the fluid sample disposed in fluid testing chamber 128, which is disposed in downhole tool 102. This light pulse may traverse through the fluid sample and to surface 108 to be processed by light spectrum analysis unit 134 to extract information regarding the chemical composition of the fluid sample. The light pulse may traverse through first fiber optic cable 300. A light pulse from light source 138 may also traverse through second fiber optic cable 302 without going through the fluid sample, which may serve as a base to compare to the light pulse moving through first fiber optic cable 300. Second fiber optic cable 302, i.e. reference channel, may be compared to the light pulse from first fiber optic cable 300. Comparing the light pulses from first fiber optic cable 300 and second fiber optic cable 302 may allow for the extraction of changes to the spectrum caused by the fluid sample.

In any example above, measuring a spectrum of the fluid sample 130 may be performed in downhole tool 102. Currently, a common way to measure a spectrum of fluid sample 130 may be to shine a light from a light source at a specific wavelength by blocking all other wavelengths. By varying specific wavelengths, the full spectrum of the fluid sample may be collected. In Fourier transform spectroscopy, the sample is irradiated with several different frequencies, and the total out coming light is measured. This process is repeated by using another combination of wavelengths, and again measuring total out coming intensity. This procedure is repeated several times. Afterword, all the data may be processed and worked back to generate the complete spectrum. However this process may be very time consuming. The data processing that is required is essentially a Fourier transform and hence Fourier transform spectroscopy.

Figure 4:
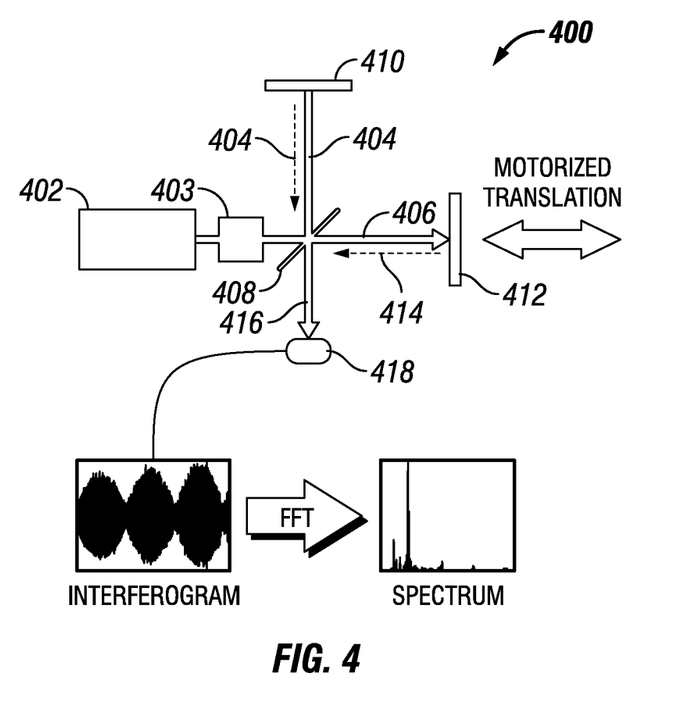
FIG. 4 illustrates a Michelson interferometer.

FIG. 4 illustrates a Michelson interferometer 400, which may be disposed in downhole tool 102 (e.g., referring to FIGS. 1-3). A collimated light source 402, i.e. light source, produces light which may pass through a fluid sample 403 and may then be split into a first beam 404 and a second beam 406 by a beam splitter 408. In examples, first beam 404 may be reflected by a fixed mirror 410, second beam 406 may be reflected by a moving mirror 412 creating a shifted frequency beam 414. Shifted frequency beam 414 experiences a frequency shift due to the Doppler Effect. Shifted frequency beam 414 and first beam 404 may be overlapped by beam splitter 408 and an interference pattern 416 may be sent to a detector 418.

It should be noted that in examples, fixed mirror 410, moving mirror 412, and detector 418 may be disposed on surface 108 in light spectrum analysis unit 134. In such examples, light that has passed through the fluid sample 403 may travel through fiber optic cables (e.g., fiber optic cable 136 on FIG. 1 or first fiber optic cable 300 on FIG. 3), as described above, to be split by fixed mirror 410. Once split a shifted frequency beam 414 may be formed, as described above, and sent to detector 418.

At detector 418, interference pattern 416 may comprise a pattern corresponding to a frequency difference between first beam 404 and shifted frequency beam 414, which may measure the shift 6. The spectrum of the incident light may be obtained from this measurement. In the case of a polychromatic light beam the relation between the spectrum of the light and the light intensity as a function of the shift is shown below:

$$I(\delta) = \int_0^{+\infty} \frac{B(f)}{2}[1 + \cos(2\pi f \delta)] df \quad (1)$$

which may be altered to produce:

$$B(f) = \int_{-\infty}^{+\infty} I'(\delta)\cos(2\pi f)d\delta \quad (2)$$

In this last integral the I'(δ) is the second term in the above integral. Depending on the type of spectroscopy, different collimated light sources 402 may be utilized. For example a monochromatic beam may be used to obtain single frequency information or a multi-chromatic light may be utilized to obtain multi-frequency information from fluid sample 130.

Figure 5:
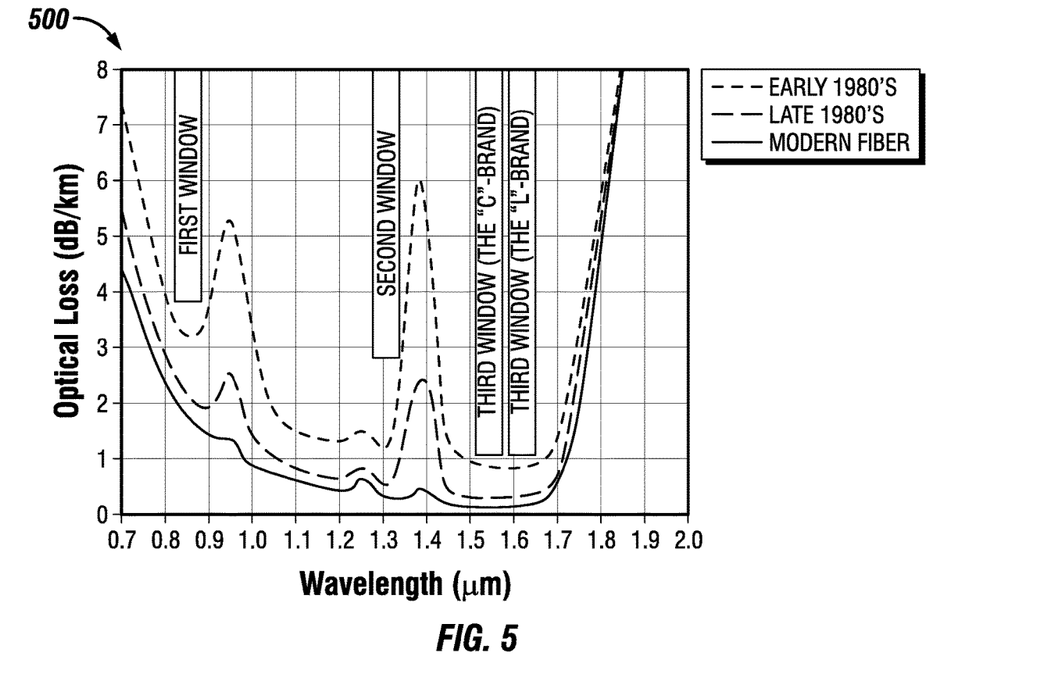
FIG. 5 illustrates a graph of attenuation in a fiber optic cable.

For the light to travel without attenuation in fiber optic cable 136 (e.g., referring to FIGS. 1-3), the spectrum of the light that goes through fiber optic cable 136 may be within the bands of low attenuation illustrated in FIG. 5. A particular type of multi-frequency light that may be utilized to traverse through fiber optic cable 136 may be produced from a frequency comb. Utilizing multiple frequency combs and techniques may have advantages in resolution and measurement time. An example of a suitable light source 138 (e.g., referring to FIGS. 1-3) for this application may include, but is not limited to, a frequency comb generated by a chip (not illustrated) that operates at least in part of a desired frequency range.

Figure 6:
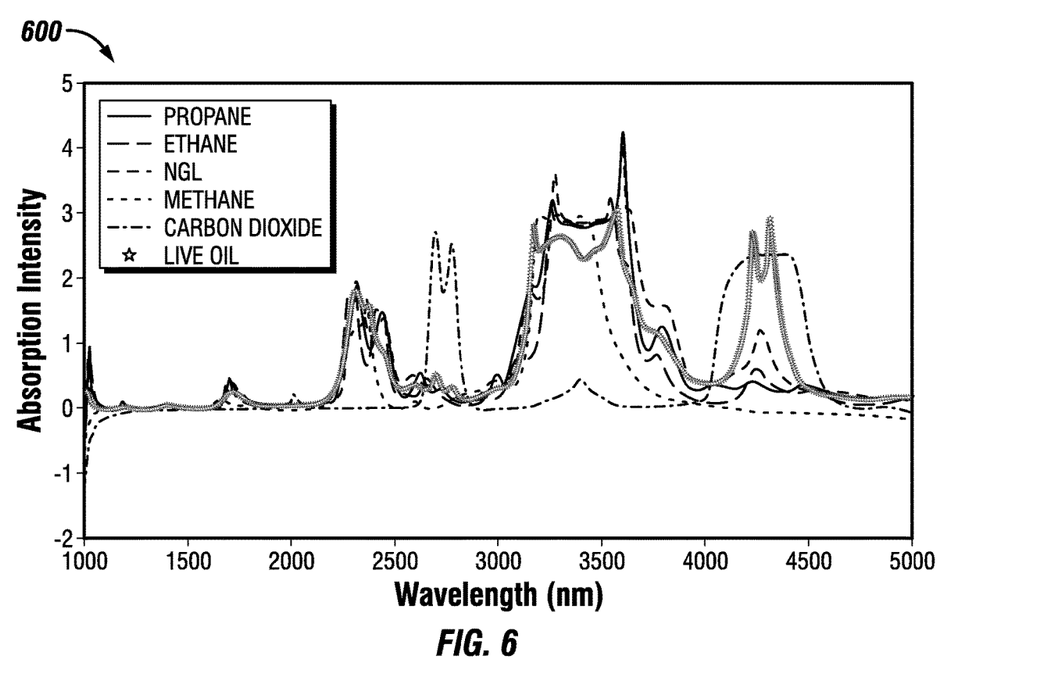
FIG. 6 illustrates a graph of an absorption spectral for a fluid sample.

When measuring a spectrum of hydrocarbons, a light spectrum may be selected in the range of low and middle infrared. Low infrared light may range from 100-214 THz and middle infrared light may range from 37-100 THZ. The light spectrum used to interrogate a sample may vary within this range depending on the components of the hydrocarbon mixture to be identified. FIG. 6 illustrates a plot of absorption spectrum 600 of the components that may be part of a typical hydrocarbon mixture. Wavelengths that may be utilized to identify the sample may go in a section with significant optical absorption, as illustrated in FIG. 6. For example, FIG. 6 illustrates approximately 1600 nm to 4600 nm. A frequency comb may contain the necessary wavelengths to allow detection of target chemical component of the sample.

Light loss over the entire length of the light path depends on the wavelength used. The typical attenuation of fiber optic cable 136 (e.g., Referring to FIGS. 1-3) is illustrated in FIG. 5. Losses may depend on selected components in the selected light spectrum. FIG. 5 illustrates a plot of attenuation 500 for silica glass fibers utilized in fiber optic cables. Other types of materials may be used in fiber optic cables 136 to obtain different absorption characteristics. Methods disclosed in this disclosure may use any type of optic fiber that may have sufficiently low attenuation and sufficiently low dispersion to provide a useful signal after traveling a distance that in an oil and gas well, for example an order of 10 km. In addition to the standard silica glass fibers, other types of fibers may comprise telluride glass and/or fluoride glass.

As illustrated in FIG. 5, due to the large losses that may occur below about 700 nm and/or above about 1700 nm, it may be difficult to send light from downhole tool 102 (e.g., referring to FIG. 1) to surface 108 outside of ranges from about 700 nm to about 1700 nm. Given that the range of absorption of typical hydrocarbon mixture is in the approximate range between about 1600 nm to about 4600 nm, the light used to probe fluid sample 130 (e.g., referring to FIG. 1) may not travel in fiber optic cable 136 (e.g., referring to FIGS. 1-3) unless it is shifted in frequency to be placed in the range of low attenuation of fiber optic cable 136.

If a frequency doubler is used, signals in the range of about 1400 nm to about 3400 nm may be converted into a range of about 700 nm to about 1700 nm. If a frequency tripler is used, the range of about 2100 nm to about 5100 nm may be converted to the range or about 700 nm to about 1700 nm. Thus, to reduce the attenuation in fiber optic cable 136 (e.g., referring to FIGS. 1-3) that takes the signal from downhole tool 102 (e.g., referring to FIGS. 1 and 2) to surface 108 (e.g., referring to FIGS. 1-3) may be to utilize a frequency multiplier, such as a frequency doubler and/or frequency tripler, disposed in the light spectrum analysis unit 134 and/or downhole tool 102. Suitable frequency multipliers may include any suitable electronic circuit that generates an output signals with an output frequency that is the desired multiple of its input frequency.

Figure 7:
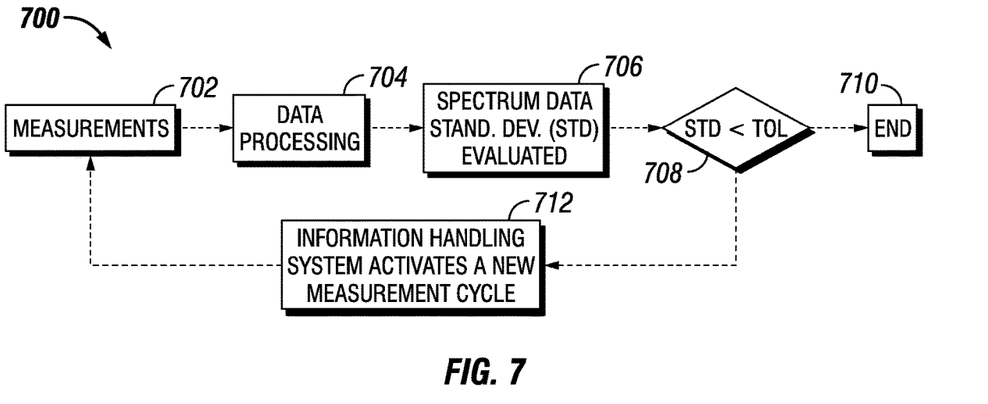
FIG. 7 illustrates a flow chart of measurement cycle.

FIG. 7 illustrates a flow chart 700 for an example a measurement cycle. As illustrated in flow chart 700, the measurement cycle may begin at block 700. At block 700, measurements may be initiated. By way of example, measurements may be performed by light spectrum analysis unit 134 within downhole tool 102 disposed in borehole 124 or on surface 108 if light spectrum analysis unit 134 is disposed outside of downhole tool 102 and on surface 108. (e.g., referring to FIGS. 1-3) Information handling system 114 may record measurement and control functions of downhole tool 102. By way of example, a fluid sample may be captured by downhole tool 102 disposed in borehole 124. The fluid sample may be disposed in fluid testing chamber 128 to be tested and measured using the methods, functions, and tools described above. Following block 702 is block 704 in which data processing may be performed.

By way of example, data processing in block 704 may comprise processing measurements found by light spectrum analysis unit 134 with information handling system 114. It should be noted that information handling system 114 may be at least a part of spectrum analysis unit 134 or may be separate and independent of light spectrum analysis unit 134. Once all measurements have been processed in block 704 in block 705 the spectrum data standard deviation may be evaluated.

In block 705 the spectrum data standard deviation may be found from processed measurements in block 704. The standard deviation is the statistical parameter that describes the stability of signals. In block 706 the standard deviation is compared to a predefined signal variation tolerance (TOL). By way of example, if the standard deviation is greater than TOL, then the measurement cycle ends in bloc 708. However, if the standard deviation is less than TOL, the measurement cycle is repeated. As illustrated in in block 710 the information handling system activates a new measurement cycle. Flow chart 700 is repeated again, starting with block 702.

Figure 8:
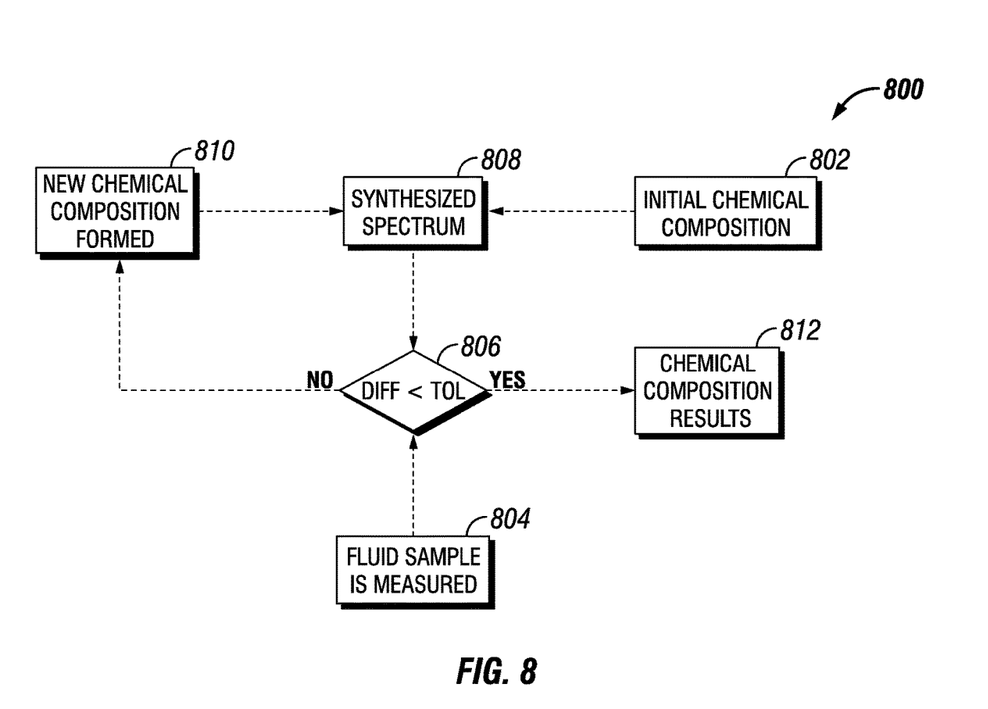
FIG. 8 illustrates a flow chart for an inversion method to determine the composition of a fluid sample.

FIG. 8 illustrates a flow chart 800 for an inversion method to determine the composition of a fluid sample. Flow chart 800 may begin with block 802 with an initial chemical composition. In examples, the initial chemical composition is chosen based on what the chemical composition of the fluid sample should be. In block 804, the fluid sample is measured. Measurement operations of the fluid sample may use the methods, functions, and tools described above. In block 806 a comparison is performed. By way of example, the initial chemical composition from block 802 and fluid sample from block 804 are compared. If the difference between the initial chemical composition and the fluid sample is above a variation tolerance, in block 810, a new chemical composition is formed.

In block 810 a new chemical composition is formed by adding an amount, or not adding an amount, of the compounds in the initial chemical composition. In block 808, a synthesized spectrum is formed. For example, the added compounds in block 810 and synthesized. From block 808, the synthesized compound is compared in block 806 to the measured fluid sample in block 804. If the difference between the synthesized compound and measured fluid sample are below the variation tolerance the synthesized compound is identified in block 812 as chemical composition results.

The quality of the inversion results may also be used to determine if more measurement cycles are needed to increase the data quality and reduce the uncertainty. A number of successive inversion results may be averaged until the uncertainty is reduced to an acceptable level. In that case the final measurement would be the average of a number of successive measurements.

This method and system may include any of the various features of the compositions, methods, and system disclosed herein, including one or more of the following statements.

Statement 1. A fluid sampling system comprising: a downhole tool positionable in a wellbore and comprising a fluid testing chamber; a light spectrum analysis unit disposed at a surface of the wellbore, wherein the light spectrum analysis unit comprises a detector; and a fiber optic cable for carrying light form the downhole tool to the light spectrum analysis unit, wherein the fiber optic cable is connected to the downhole tool and the light spectrum analysis unit.

Statement 2. The system of statement 1, further comprising a light source, wherein the light source is disposed in the downhole tool.

Statement 3. The system of any previous statement, further comprising a frequency multiplier disposed in the light spectrum analysis unit for receiving the light form a light source.

Statement 4. The system of any previous statement, wherein the light source is configured to broadcast a light pulse that traverses through the frequency multiplier and into the fiber optic cable to the downhole tool.

Statement 5. The system of any previous statement, wherein the light pulse is configured to traverse through a fluid sample disposed in the fluid testing chamber and traverses through the fiber optic cable to the light spectrum analysis unit.

Statement 6. The system of statement 1, further comprising a second fiber optic cable for carrying light from the light spectrum analysis unit to the downhole tool, wherein the light spectrum analysis unit is disposed on the surface.

Statement 7. The system of statement 6, further comprising a light source, wherein the light source is disposed in the light spectrum analysis unit, wherein the light source comprises a frequency comb.

Statement 8. The system of statement 6 and statement 7, further comprising a frequency multiplier disposed in the downhole tool for receiving light from a light source.

Statement 9. The system of statements 6-8, further comprising a beam splitter, wherein the beam splitter is disposed in the light spectrum analysis unit.

Statement 10. The system of statements 6-9, wherein the downhole tool is disposed in the wellbore.

Statement 11. The system of statements 6-10, further comprising an information handling system configured to produce a spectrum data from light detected by the detector, apply a standard deviation to the spectrum data, and apply a tolerance to the standard deviation.

Statement 12. The system of statements 6-11, wherein the information handling system is configured to initiate transmission of one or more additional light pulses from a light source to the fluid testing chamber if the standard deviation is below the tolerance.

Statement 13. A method for identifying a fluid sample comprising: disposing a downhole tool in a wellbore, wherein the downhole tool comprises: a fluid testing chamber; activating a light source; broadcasting a light from the light source; irradiating a fluid sample disposed in the fluid testing chamber with the light; and analyzing the light to produce a measured spectrum in a measurement cycle.

Statement 14. The method of statement 13, further comprising broadcasting the light through a frequency multiplier and into a fiber optic cable, wherein the fiber optic cable is attached to the downhole tool and the light spectrum analysis unit.

Statement 15. The method of statement 13 and statement 14, further comprising splitting the light with a beam splitter into a first beam and a second beam, wherein the beam splitter is disposed at a surface of the wellbore.

Statement 16. The method of statements 13-15, wherein the information handling system is configured to end the measurement cycle if the standard deviation is above the tolerance.

Statement 17. The method of statements 13-16, wherein the first beam is reflected off a fixed mirror and the second beam is reflected of a moving mirror.

Statement 18. The method of statements 13, wherein the light source is disposed in the downhole tool.

Statement 19. The method of statement 18, further comprising applying a standard deviation to the measured spectrum, and applying a tolerance to the standard deviation.

Statement 20. The method of statement 18, further comprising starting a second measurement cycle if the standard deviation is below the tolerance.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A fluid sampling system comprising:
a downhole tool positionable in a wellbore and comprising a fluid testing chamber;
a light spectrum analysis unit disposed entirely at a surface of the wellbore, wherein the light spectrum analysis unit comprises a detector configured to receive an interference pattern;
a light source configured to transmit a light wherein the light source includes an integrated frequency comb, and wherein the frequency comb includes a wavelength division multiplexing modulation system configured to increase one or more channels of the light; and
a fiber optic cable for carrying light from the downhole tool to the light spectrum analysis unit, wherein the fiber optic cable is connected to the downhole tool and the light spectrum analysis unit.

2. The system of claim 1, wherein the light source is disposed in the downhole tool.

3. The system of claim 1, further comprising a frequency multiplier disposed in the light spectrum analysis unit for receiving the light from the light source.

4. The system of claim 3, wherein the light source is configured to broadcast a light pulse that traverses through the frequency multiplier and into the fiber optic cable to the downhole tool.

5. The system of claim 4, wherein the light pulse is configured to traverse through a fluid sample disposed in the fluid testing chamber and traverses through the fiber optic cable to the light spectrum analysis unit.

6. The system of claim 1, further comprising a second fiber optic cable for carrying light from the light spectrum analysis unit to the downhole tool, wherein the light spectrum analysis unit is disposed on the surface.

7. The system of claim 6, wherein the light source is disposed in the light spectrum analysis unit, wherein the light source comprises a frequency comb.

8. The system of claim 6, further comprising a frequency multiplier disposed in the downhole tool for receiving light from the light source.

9. The system of claim 8, further comprising a beam splitter, wherein the beam splitter is disposed in the light spectrum analysis unit.

10. The system of claim 9, wherein the downhole tool is disposed in the wellbore.

11. The system of claim 6, further comprising an information handling system configured to produce a spectrum data from light detected by the detector, apply a standard deviation to the spectrum data, and apply a tolerance to the standard deviation.

12. The system of claim 11, wherein the information handling system is configured to initiate transmission of one or more additional light pulses from the light source to the fluid testing chamber if the standard deviation is below the tolerance.

13. A method for identifying a fluid sample comprising: disposing a downhole tool in a wellbore, wherein the downhole tool comprises:
a fluid testing chamber; and
a light source configured to transmit a light wherein the light source includes an integrated frequency comb, and wherein the frequency comb includes a wavelength division multiplexing modulation system configured to increase one or more channels of the light;
activating the light source;
broadcasting the light from the light source;
irradiating a fluid sample disposed in the fluid testing chamber with the light; and
analyzing the light to produce a measured spectrum in a measurement cycle with a light spectrum analysis unit disposed entirely at the surface of the wellbore, wherein the light spectrum analysis unit comprises a detector configured to receive an interference pattern.

14. The method of claim 13, further comprising broadcasting the light through a frequency multiplier and into a fiber optic cable, wherein the fiber optic cable is attached to the downhole tool and the light spectrum analysis unit.

15. The method of claim 13, further comprising splitting the light with a beam splitter into a first beam and a second beam, wherein the beam splitter is disposed at a surface of the wellbore.

16. The method of claim 15, wherein the first beam is reflected off a fixed mirror and the second beam is reflected of a moving mirror.

17. The method of claim 16, wherein the light source is disposed in the downhole tool.

18. The method of claim 13, further comprising applying a standard deviation to the measured spectrum and applying a tolerance to the standard deviation.

19. The method of claim 18, further comprising starting a second measurement cycle if the standard deviation is below the tolerance.

20. The method of claim 18, further comprising ending the measurement cycle if the standard deviation is above the tolerance.

21. A fluid sampling system comprising:
  a downhole tool positionable in a wellbore and comprising a fluid testing chamber;
  a light spectrum analysis unit disposed at a surface of the wellbore, wherein the light spectrum analysis unit comprises a detector;
  a light source configured to transmit a light wherein the light source includes an integrated frequency comb, and wherein the frequency comb includes a wavelength division multiplexing modulation system configured to increase one or more channels of the light;
  a fiber optic cable for carrying light from the downhole tool to the light spectrum analysis unit, wherein the fiber optic cable is connected to the downhole tool and the light spectrum analysis unit;
  a second fiber optic cable for carrying light from the light spectrum analysis unit to the downhole tool, wherein the light spectrum analysis unit is disposed on the surface; and
  an information handling system configured to produce a spectrum data from light detected by the detector, apply a standard deviation to the spectrum data, and apply a tolerance to the standard deviation, wherein the information handling system is configured to initiate transmission of one or more additional light pulses from the light source to the fluid testing chamber if the standard deviation is below the tolerance.

22. A method for identifying a fluid sample comprising: disposing a downhole tool in a wellbore, wherein the downhole tool comprises:
  a fluid testing chamber; and
  a light source configured to transmit a light wherein the light source includes an integrated frequency comb, and wherein the frequency comb includes a wavelength division multiplexing modulation system configured to increase one or more channels of the light;
activating the light source;
broadcasting the light from the light source;
irradiating a fluid sample disposed in the fluid testing chamber with the light;
analyzing the light to produce a measured spectrum in a measurement cycle; and
splitting the light with a beam splitter into a first beam and a second beam, wherein the beam splitter is disposed at a surface of the wellbore and the first beam is reflected off a fixed mirror and the second beam is reflected of a moving mirror.

23. A method for identifying a fluid sample comprising: disposing a downhole tool in a wellbore, wherein the downhole tool comprises:
  a fluid testing chamber; and
  a light source configured to transmit a light wherein the light source includes an integrated frequency comb, and wherein the frequency comb includes a wavelength division multiplexing modulation system configured to increase one or more channels of the light;
activating the light source;
broadcasting the light from the light source;
irradiating a fluid sample disposed in the fluid testing chamber with the light;
analyzing the light to produce a measured spectrum in a measurement cycle; and
splitting the light with a beam splitter into a first beam and a second beam, wherein the beam splitter is disposed at a surface of the wellbore, the first beam is reflected off a fixed mirror and the second beam is reflected of a moving mirror, and the light source is disposed in the downhole tool.

24. A method for identifying a fluid sample comprising: disposing a downhole tool in a wellbore, wherein the downhole tool comprises:
  a fluid testing chamber; and
  a light source configured to transmit a light wherein the light source includes an integrated frequency comb, and wherein the frequency comb includes a wavelength division multiplexing modulation system configured to increase one or more channels of the light;
activating the light source;
broadcasting the light from the light source;
irradiating a fluid sample disposed in the fluid testing chamber with the light;
analyzing the light to produce a measured spectrum in a measurement cycle;
applying a standard deviation to the measured spectrum and applying a tolerance to the standard deviation; and
starting a second measurement cycle if the standard deviation is below the tolerance.

25. A method for identifying a fluid sample comprising: disposing a downhole tool in a wellbore, wherein the downhole tool comprises:
  a fluid testing chamber; and
  a light source configured to transmit a light wherein the light source includes an integrated frequency comb, and wherein the frequency comb includes a wavelength division multiplexing modulation system configured to increase one or more channels of the light;
activating the light source;
broadcasting the light from the light source;
irradiating a fluid sample disposed in the fluid testing chamber with the light;
analyzing the light to produce a measured spectrum in a measurement cycle;
applying a standard deviation to the measured spectrum and applying a tolerance to the standard deviation; and
ending the measurement cycle if the standard deviation is above the tolerance.

* * * * *

UNITED STATES PATENT AND TRADEMARK OFFICE
CERTIFICATE OF CORRECTION

PATENT NO. : 11,275,022 B2
APPLICATION NO. : 16/482588
DATED : March 15, 2022
INVENTOR(S) : Satyan Gopal Bhongale, Luis Emilio San Martin and Tia He It is certified that error appears in the above-identified patent and that said Letters Patent is hereby corrected as shown below:

In the Specification

Column 7 Line 19 please remove "6" and replace with -- $\delta$ --.

Signed and Sealed this
Seventeenth Day of May, 2022

*Katherine Kelly Vidal*

Katherine Kelly Vidal
*Director of the United States Patent and Trademark Office*